United States Patent [19]

Graham

[11] 3,995,290

[45] Nov. 30, 1976

[54] MECHANICAL SEQUENCING SYSTEM FOR FIRING PHOTOFLASH LAMPS

[75] Inventor: Thomas G. Graham, Emerson, N.J.

[73] Assignee: Berkey Photo, Inc., Clifton, N.J.

[22] Filed: Feb. 28, 1975

[21] Appl. No.: 554,209

[52] U.S. Cl. .............................. 354/128; 354/143; 354/148
[51] Int. Cl.² ....................................... G03B 15/02
[58] Field of Search ............ 354/126, 127, 132, 139, 354/144, 148, 128, 143; 240/1.3; 431/95

[56] References Cited
UNITED STATES PATENTS

| | | | |
|---|---|---|---|
| 3,438,315 | 4/1969 | Goshima et al. | 240/1.3 X |
| 3,452,660 | 7/1969 | Schultz et al. | 240/1.3 X |
| 3,454,756 | 7/1969 | Iwata et al. | 240/1.3 |
| 3,805,282 | 4/1974 | Erlichman | 354/144 |

Primary Examiner—Fred L. Braun
Attorney, Agent, or Firm—Neuman, Williams, Anderson & Olson

[57] ABSTRACT

An apparatus for mechanically moving a sliding contact associated with an indexing assembly along a series of contact pads. The contact pads are sequentially arranged whereby flash lamps connected thereto and disposed in an array mounted on an associated camera are fired in sequence upon closing of an energizing circuit in the course of actuating the camera shutter. The apparatus includes an indicator device for indicating which flashlamp in the array is electrically connected to the firing circuit through the sliding contact.

8 Claims, 7 Drawing Figures

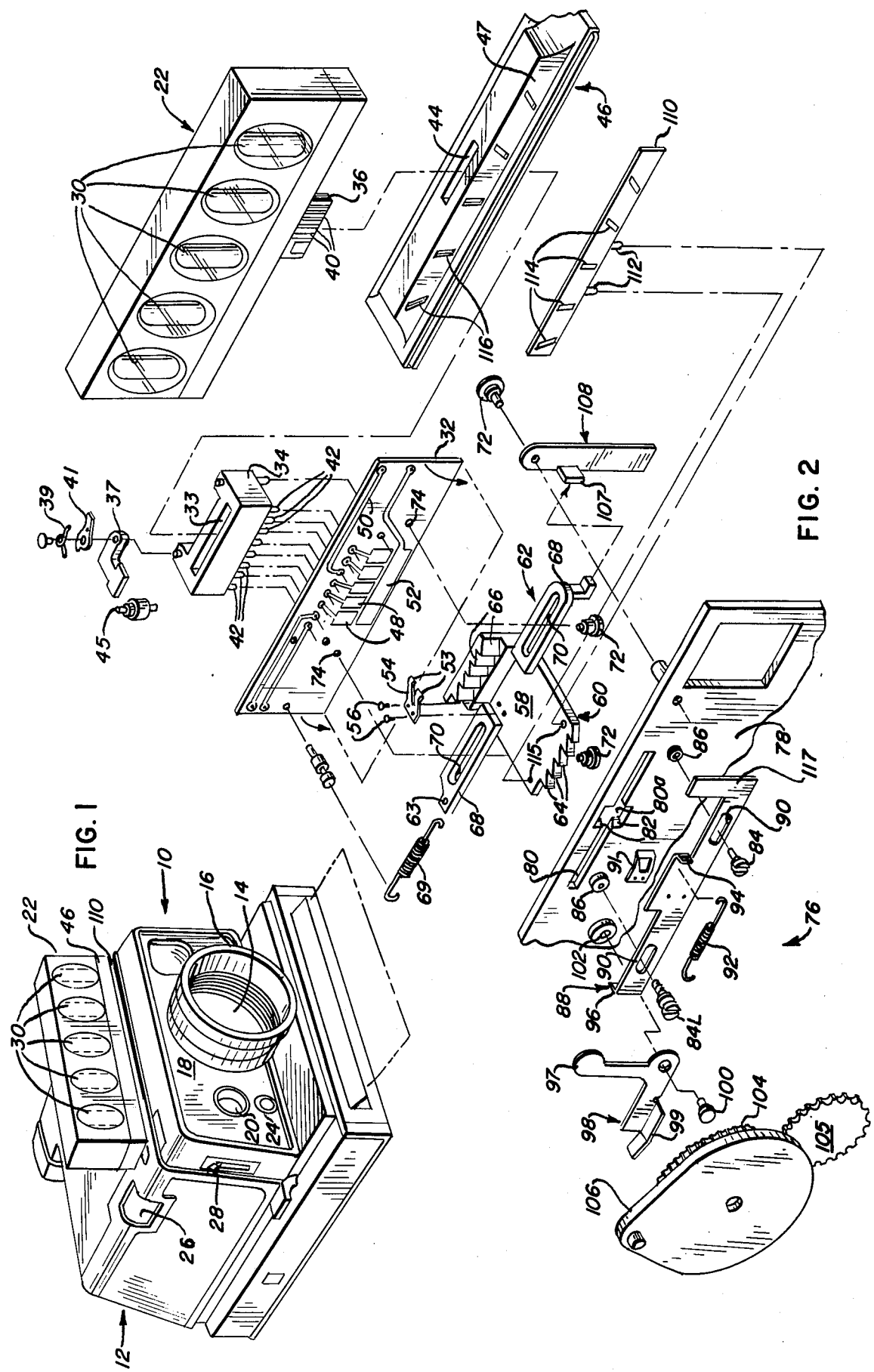

FIG. 5
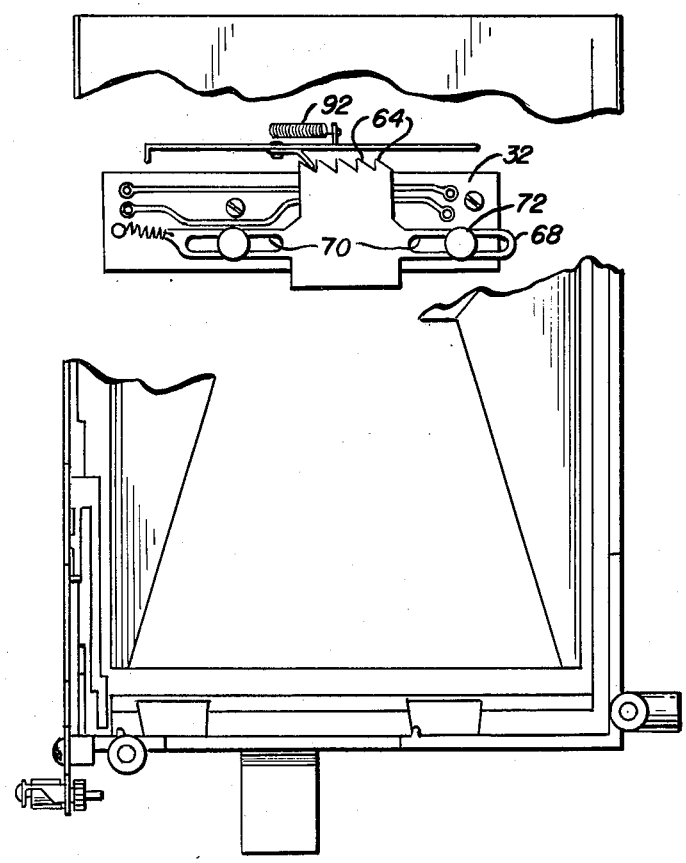
FIG. 7
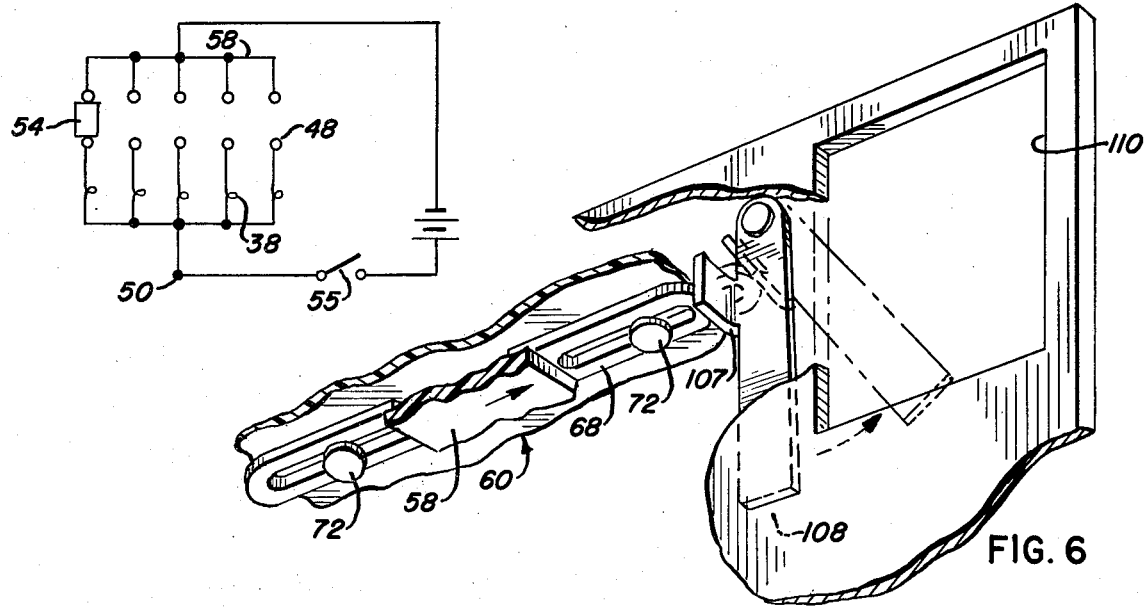
FIG. 6

MECHANICAL SEQUENCING SYSTEM FOR FIRING PHOTOFLASH LAMPS

BACKGROUND OF THE INVENTION

This invention relates to a simple and inexpensive mechanical combination adapted to fire individual photoflash lamps in sequence. The provided invention is particularly adapted to be embodied in a low-cost mechanical combination adapted to assist in sequentially firing individual lamps of photoflash arrays packaged in disposable containers which are easily inserted in a socket mount of an associated camera.

The prior art has employed a variety of apparatus for sequentially firing photoflash lamps disposed in an array readily mounted on an associated camera. Such apparatus employs complex and expensive sequencing circuitry. Such electrically operable sequencing means, although more costly to manufacture, are oftentimes subject to operational difficulties peculiar to the particular sequencing circuit employed.

Despite the expense necessitated in the manufacture of the circuitry employed in such lamp-firing apparatus, many electrical sequencing systems are directed solely to sequential lamp firing and for example do not provide any signal that the last lamp in the array has been fired. Thus a camera operator must maintain constant visual surveillance or maintain a constant mental count of the fired lamps to avoid wasting a film frame by inadvertently triggering the firing mechanism after the last lamp has been fired.

SUMMARY OF THE INVENTION

In accordance with this invention a simple, inexpensive sequencing apparatus is provided which fires lamps in a camera-mounted array in sequence without the need for electrical circuitry other than that employed in connecting the individual lamps to a power source such as a battery. The sequencing means of the provided apparatus comprises an indexing means which moves a contact over a simple printed circuit board whereby lamps of an array are connected seriatim with a battery which fires the lamps in sequence in conjunction with actuation of the camera shutter.

Despite the mechanical simplicity of the provided sequencing apparatus, it is an object of this invention to provide a lamp-firing sequencing apparatus in which a "stop" signal is moved into view in the associated camera viewfinder. Such signal positively informs the camera operator that the last lamp in the array has been fired and obviates wastage of film occasioned by inadvertently attempting to take a flash-assisted picture after the last lamp has been fired.

It is a further object of this invention to provide an inexpensive sequencing system for firing flash lamps which employs an indicator for readily revealing the specific lamp in an array to be fired and constantly visually revealing the number of unfired lamps in the flashlamp array.

It is another object of this invention to provide a sequencing system employed in combination with well-known and common camera components whereby a movable contact is indexed by actuation of a shutter-cocking gear and the lamps are fired by releasing the shutter. Thus the provided system lends itself to ready adaptability to known camera constructions without major camera design revision.

The above and other objects of this invention will become more apparent from the following detailed description and appended claims when read in the light of the accompanying drawings in which:

FIG. 1 is a perspective front view of a camera adapted to employ the sequencing system of this invention;

FIG. 2 is a perspective exploded view of elements employed in one embodiment of the provided sequencing system together with a flash lamp unit and mount employed therewith;

FIG. 5 is a fragmentary bottom plan view of the camera of FIG. 1 with the outer housing removed and with interior supporting structure broken away to illustrate elements of the sequencing apparatus of this invention;

FIG. 6 is an enlarged fragmentary perspective view illustrating an indexing element employed in the provided sequencing system in the process of moving an indicator into a view finder opening to indicate that the last flash lamp of an array has been fired; and FIG. 7 is a schematic circuit diagram of the lamp-firing circuit employed in the provided system.

DESCRIPTION OF THE INVENTION

Figure 3:
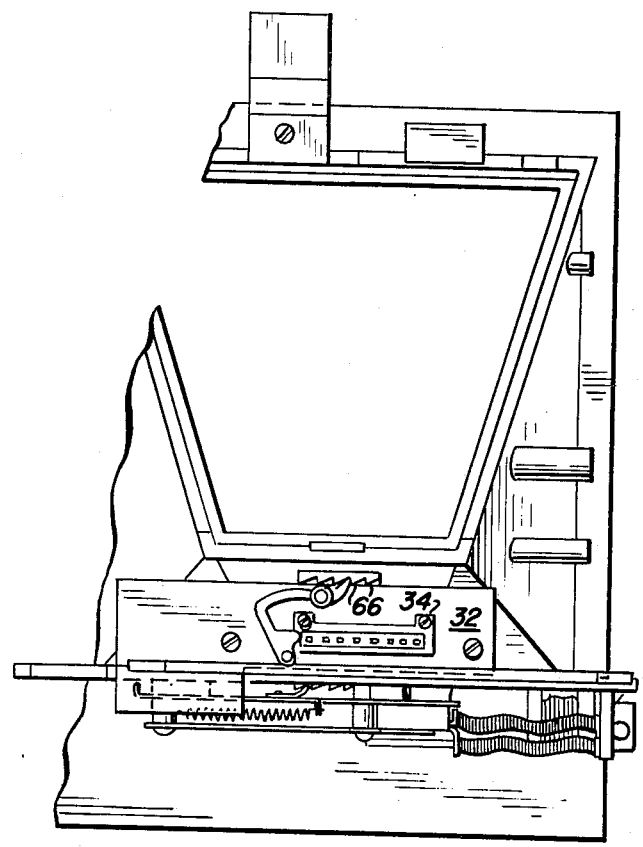
FIG. 3 is a fragmentary top plan view of the camera of FIG. 1 with the outer housing and flash unit removed.
Figure 4:
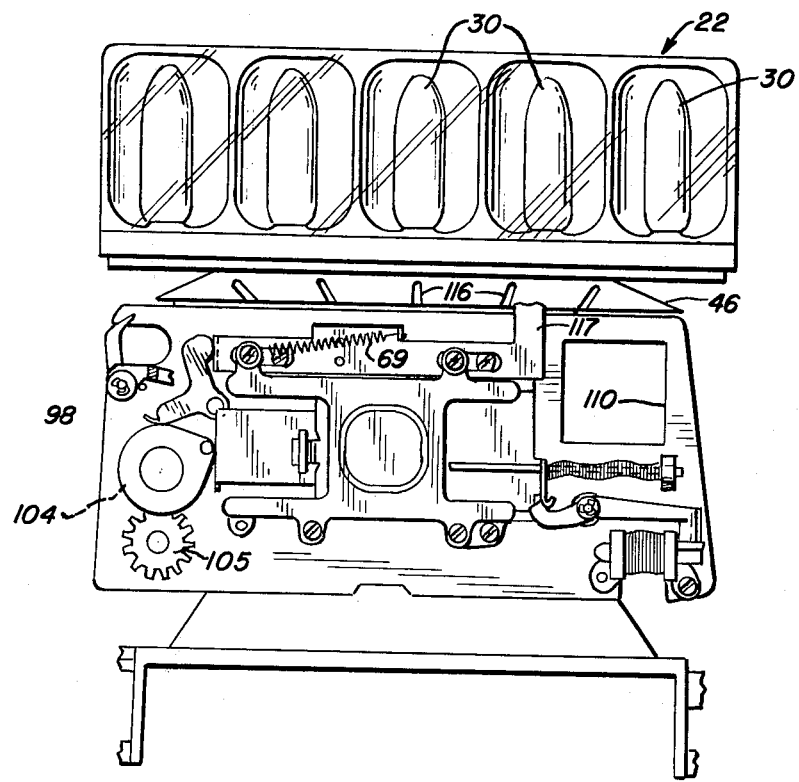
FIG. 4 is a front elevational view of the camera of FIG. 1 with the outer housing removed.

Referring to FIG. 1 of the drawings a camera 10 is illustrated having an opaque housing 12, a focusing lens 14 encompassed by an exposed manually adjustable focusing ring 16 mounted in front face 18 thereof. Auxiliary opening 20 permits light rays to engage a photoelectric cell which is operable when flash lamp array 22 is removed from the top of the camera housing. A second auxiliary opening 24 allows light rays to engage a second photoelectric cell employed in conjunction with a low light level indicator for the view finder and indicates whether a flash unit is necessary. Shutter release button 26 manually releases the shutter with or without use of flash unit 22.

In accordance with this invention an individual photoflash lamps such as lamps 30 in unit 22 are sequentially actuated and fired by a mechanical sequencing system. Unit 22 may comprise sets of multiple photoflash lamps manufactured by the General Electric Company, Nela Park, Cleveland, Ohio and sold under the term "Flashbar". Each unit 22 comprises two arrays of five separate photoflash lamps 30. Each separate lamp is comprised of a filament disposed within a transparent bulb containing oxygen and other combustible material and connected between two lamp terminals. The filament initially has a relatively low electrical impedance. The lamp is fired by passing a relatively high magnitude electric current through the filament causing it to burn and ignite the contents, causing a bright flash of light. The lamps 30 of each array are physically disposed along one side of the unit 22. One terminal of each of the five lamps 30 is connected to one terminal of each of the other lamps to form a common terminal for that array. The common terminal and the remaining terminal of each lamp of the array are each electrically coupled to a respective electrical conductive means on a connector means. The connector means provides means for applying electrical currents to the separate photoflash lamps as well as means for securing the array to the camera with which it is to be used. The construction and function of the said General Electric photoflash lamp set is well known.

The provided system components and manner of assembly will be seen from the exploded view of FIG. 2. It will be noted from the latter figure that printed circuit board 32 has mounted on the upper (in the normal position of use) surface thereof a flash unit socket 34 in which radiused projecting connector 36 of unit 22 is adapted to be snugly received after traversing opening 44 of interposed flash unit mount 46. Connecting strips 40 are in electrical communication with the overlying lamps 30, and electrically engage prongs 42 when inserted in opening 33 of socket 34 after traversing mount 46 in the manner indicated by the assembly lines which reveal the manner of association for the elements illustrated in FIG. 2.

Board 32, in the normal position of use, is disposed horizontally, parallel to the top and bottom of camera 10 with the printed circuitry disposed lowermost. Five prongs 42 of socket 34 establish electrical contact with five aligned contact pads 48 of board 32 and common terminal 50 effects electrical communication between each lamp 30 and a power supply such as a battery. The two left-most prongs 42 in FIG. 2 assist in rendering an automatic shutter control inoperative when employing a flash unit and comprise no part of this invention. Common bus pad 52 enables a complete electrical circuit to be established for purposes of energizing a lamp then the circuit is completed by spaced prongs 53 of a movable contact 54. The contact is mounted by means of screws 56 or equivalent securing means to plate portion 58 of central L-shaped member 60 of indexing assembly 62 and is able to simultaneously resiliently engage a pad 48 and bus 52 in the course of slidably moving over circuit board 32.

Assembly 62 is mounted on the undersurface of board 32 and comprises an indexing means which allows contact 54 to move over contact pads 48 seriatim from left to right as illustrated in FIG. 2. While the contact 54 engages each pad 48, a lamp-firing current is transmitted to each corresponding lamp in conjunction with a shutter-releasing movement in the camera which closes a normally open, circuit-completing switch 55 as seen in FIG. 7.

Central L-shaped member 60 has drive teeth 64 disposed at one end portion thereof disposed in the direction of the camera face and detent teeth 66 disposed parallel to teeth 64 at the opposite end portion of member 60. Opposing lateral guide arm portions 68 affixed to spaced edge portions of member 60 are slotted at 70 for slidable engagement with screws 72, having enlarged heads, or equivalent securing means which traverse the slots by means of their shank portions and are anchored in openings 74 in board 32. The bottom view of FIG. 5 illustrates indexing assembly 62 movably secured in place by screws 72 to the bottom of circuit board 32.

In the course of inserting the flash unit connector 36 in socket 34 mounted on the circuit board 32, the adjacent radiused end of connector 36 forces pivotally mounted detent lever 37 mounted on pin 45 on the top of board 32 to pivot against the action of return spring 39. Detent pawl 41 is adapted to engage detent teeth 66 of L-shaped member 60, which teeth project upwardly behind the rear edge of circuit board 32 as seen in FIG. 3 in the normal position of assembly.

The means effecting step-wise movement of the indexing assembly 62 over the printed circuitry of board 32 comprises transmission assembly 76 of FIG. 2. Assembly 76 is reciprocally mounted on shutter base 78 fragmentarily shown in FIG. 2, in the normal position of use is disposed at the face of the camera in the vertical plane, and has an elongate slot 80 for passage therethrough of drive teeth 64. The slot 80 includes a central enlargement 80a having adjacent thereto sloping edge portions 82 of the shutter base which define a ramp and gradually slope the outer illustrated planar surface of shutter base 78 into the central slot opening 80a.

Reciprocally mounted over shutter base portion 78 by means of screws 84 or equivalent securing means which engage anchors 86 is a teeth driving lever 88 having opposed slots 90 traversed by large-headed screws 84L and 84, and a curved pawl 91 adapted to be secured to the rear face of lever 88 in the vicinity of the two dots illustrated on the pawl and lever. The screw 84L serves the double function of securing the lever 88 in place and also of anchoring a hook end of biasing spring 92 by means of a reduced neck portion. Spring 92 may be otherwise appropriately anchored on the face of shutter base portion 78. The spring 92 also engages eye 94 of lever 88 so that the same is constantly biased to the left as illustrated in FIG. 2.

Left end 96 of lever 88 is adapted to be urged to the right by end 97 of pivoting arm 98 which is pivotally mounted on screw 100 anchored in boss 102. Arm 98 is pivoted clockwise by recocking the camera shutter and simultaneously rotating gear 104 clockwise when actuating lever 28 of FIG. 1. Such clockwise rotation of gear 104 may be effected by drive gear 105 which, in turn, may be manually rotated by actuation of such cocking lever or may be motor driven in manners well known in the art. Cam surface 106 disposed about gear 104 then engages cam follower portion 99 of arm 98 which drives lever 88 to the right as pawl 91 slides down ramp edges 82 defining opening 80a. The L-shaped member is at its left-most position as a result of the biasing action of spring 69 engaging eye 63 of the left guide arm 68. When lever 88 is urged to the right, the right-most tooth 64 is engaged by the pawl and moves the indexing assembly 62 a distance to the right slightly greater than one tooth. Simultaneously, detent pawl 41 is slidably disengaged from an engaged detent tooth 66 and engages the second right-most tooth 66, after which lever 88 is allowed to return to its left-most position under the urging of spring 92. Contact 54 is now contacting the next lamp pad 48 and common bus 52 and the associated lamp is thus ready to be fired in the course of shutter release by depressing button 26.

After the fifth and final lamp of the five-lamp array in unit 22 is fired, the next actuation of assembly 76 effected in the course of cocking the camera shutter, causes right guide arm 68 of assembly 62 to engage tab 107 of indicator arm 108 which is pivotally mounted on the shutter base 78. The arm 108 is pivoted counterclockwise (see FIG. 6) to move into view finder opening 110 and immediately inform the camera user that the last flash lamp of the array in unit 22 has been fired. Thus a new flash lamp array must be readied for use in socket 34 if additional flash pictures are desired. At this point the blank areas to the extreme left of the ratchet teeth 64 and 66 present themselves to the pawls 41 and 91 and no further indexing of assembly 62 can occur.

For purposes of informing the camera user as to the next lamp 30 to be fired, and thus the number of unfired lamps, lamp indicator panel 110 is mounted by means of posts 112 in apertures 115 disposed in surface 58 of L-shaped member 60 and is disposed behind face surface 47 of mount 46 disposed on the top of the camera 10. Panel 110 has marks 114 which correspond to apertures 116 in mount 46 but are arranged closer together than apertures 116 by an amount equal to the pitch of the ratchet teeth 64 and 66. In the fully leftward position of assembly 62, the left-most indicator mark 114 of panel 110 is in line with the left-most aperture 116 of mount 46. Such alignment will serve as an indicator or mark pointing to the left-most lamp 30 which is now ready to be fired. The remaining indicator mark will be non-aligned with mount openings 116 which may be slot-like as illustrated or arrow-form. The second marking from the left of panel 110 is then one pitch unit leftward of its corresponding mount aperture 116 and thus masked out as are the third marking 114, two pitch values from alignment with the corresponding mount aperture, the fourth indicator marking three pitch values away and the fifth marking four pitch values away from its corresponding mount aperture. Thus each time assembly 62 is indexed, the indicator mark appears to move to the next aperture 116 on the mount 46. The slants of the apertures assist in identifying the lamp which is ready for firing.

When the unit 22 is removed, spring 39 moves lever arm 37 clockwise, disengaging pawl 41 from engagement with ratchet teeth 66. Since in the rest positions between indexing movements pawl 91 is withdrawn from teeth 64 by ramp 82, assembly 62 is pulled left by spring 69 and an indicator mark 114 becomes visible in the left-most opening of mount 46. The assembly is thus in condition to fire lamp number 1 of a new array to be inserted in socket 34.

Thus if a flash lamp unit 22 is removed before the last flash lamp is fired, the sequencing assembly will return to the "number 1" position in the manner above described. Upon reinserting a partially used lamp array, right arm 117 of lever 88 which protrudes from the camera housing is manually engaged and moved right until the indicator mark 114 on panel 110 corresponding to the first unfired lamp is visible through corresponding opening 116 of the mount 46. The remaining bulbs are then fired in the manner above indicated.

The wiring diagram of FIG. 7 emphasizes the simplicity of the provided invention whereby movable contact 54 may slide sequentially over pads 48 and each associated lamp fired in sequence upon closing of normally open switch 55 upon actuation of the shutter release button 26.

It is thus seen that a mechanical sequencing system for firing photoflash lamps has been provided which is composed of simple, inexpensive components. The elements are easily mounted in place and may be readily incorporated in basic camera designs. The provided system, despite its simplicity, is adapted to continuously visually inform a camera user of the number of flash lamps remaining for use and also includes a signal which advises the user when the last lamp has been fired.

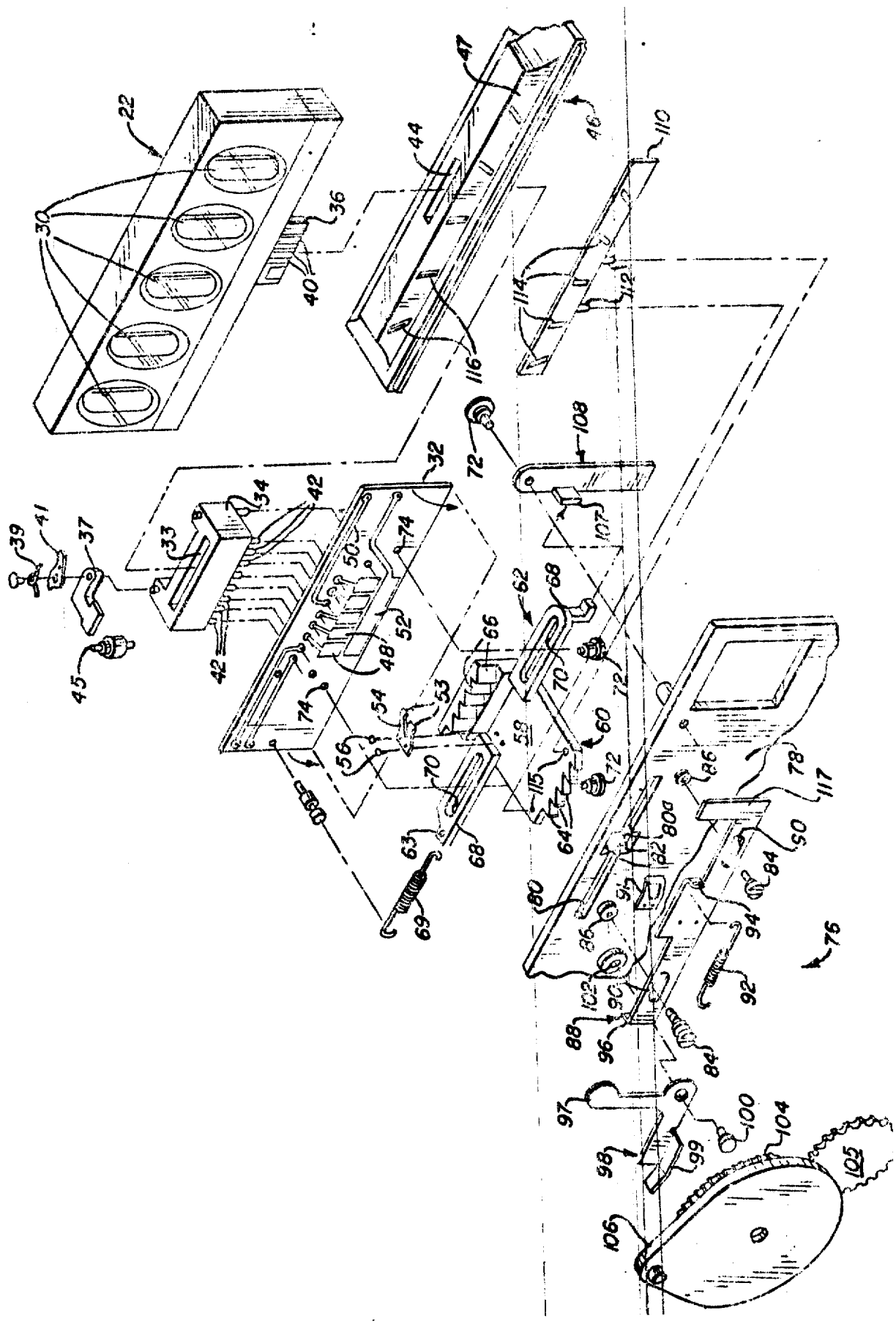

I claim:

1. In a sequencing system for firing flash lamps in an array mounted on a camera or the like, the combination comprising a plurality of aligned contact pads disposed in an electrical circuit; each of said contacts being in electrical communication with one of said lamps of said array; a contact slidably movable along a path having said pads disposed therein in spaced relation at predetermined intervals; indexing means on which said contact is mounted adapted to drive said contact from pad to pad seriatim upon consecutive actuations of said indexing means; a power source for firing said flash lamps and a normally open switch disposed in said electrical circuit; said switch being closed upon actuating a camera shutter release with which said switch is operatively connected; said contact being mounted on a resiliently biased indexing member having spaced sets of ratchet teeth; a reciprocating pawl adapted to engage and drive a first set of said ratchet teeth in one direction of its reciprocal movement and leave engagement therewith in the opposite direction of said movement, and detent means adapted to engage a second set of said ratchet teeth and maintain said indexing member in said one direction of movement after being driven by said pawl.

2. The system of claim 1 in which said pads are disposed on a printed circuit board and said indexing member is mounted thereon and resiliently biased to move in one direction relative to said path.

3. The sequencing system of claim 1 in which a movable signal is disposed at one end limit of said indexing means movement and moved by said indexing means.

4. The sequencing system of claim 1 in which said array is mounted over a fixed apertured mount disposed on a camera, and an indicator panel having markings thereon is mounted on said indexing member and disposed behind the apertures of said fixed mount; each of said mount apertures and panel markings being associated with a lamp of said array; the apertures of said mount and the markings of said indicator panel being so related to movement of said contact on said indexing member that when said contact engages a pad associated with a specific lamp of said array, the aperture in said mount and the mark on said panel associated with said specific lamp only are in alignment.

5. The sequencing system of claim 4 in which said apertures in said mount comprise slots directed at the overlying lamps with which associated and said panel marks are of similar configuration and spaced closer together than the mount slots by an amount equal to the pitch of the first set of ratchet teeth.

6. The sequencing system of claim 1 in which said pawl is mounted on a reciprocally movable lever and has the leading edge thereof slidably movable over a slotted guide surface in which said first set of ratchet teeth is disposed, said slotted guide surface having a sloping ramp over which said pawl is guided into engagement with said first set of ratchet teeth while moving in the drive direction of movement and over which said pawl is withdrawn from engagement with said first set of ratchet teeth upon movement of said lever in the direction opposite to said drive direction.

7. The sequencing system of claim 6 in which said lever is given a pawl driving movement by actuation of a camera shutter cocking means operatively connected to said lever.

8. The sequencing system of claim 6 in which said lever has an end portion which protrudes from a camera in which it is mounted so as to be manually engageable and movable in the drive direction.

* * * * *

UNITED STATES PATENT AND TRADEMARK OFFICE
CERTIFICATE OF CORRECTION

PATENT NO. : 3,995,290

DATED : November 30, 1976

INVENTOR(S) : Thomas G. Graham

Page 1 of 2

It is certified that error appears in the above—identified patent and that said Letters Patent are hereby corrected as shown below:

Column 4, line 21, cancel "otherwise" before "appropriately"

Column 4, line 21, after "anchored" insert -- at its opposed hook end --

On the title page, the drawing figure should appear as shown on the attached sheet.

Signed and Sealed this

Twenty-ninth Day of March 1977

[SEAL]

Attest:

RUTH C. MASON
*Attesting Officer*

C. MARSHALL DANN
*Commissioner of Patents and Trademarks*